(12) United States Patent
Yun et al.

(10) Patent No.: US 11,823,308 B2
(45) Date of Patent: Nov. 21, 2023

(54) FREEHAND SKETCH IMAGE GENERATING METHOD AND SYSTEM FOR MACHINE LEARNING

(71) Applicant: RECON LABS INC., Seoul (KR)

(72) Inventors: Kyungwon Yun, Seoul (KR); Roger Blanco, Goyang-si (KR); Kyung Hoon Hyun, Seoul (KR); Seonghoon Ban, Seoul (KR)

(73) Assignee: RECON LABS INC., Seoul (KR)

( * ) Notice: Subject to any disclaimer, the term of this patent is extended or adjusted under 35 U.S.C. 154(b) by 4 days.

(21) Appl. No.: 17/583,323

(22) Filed: Jan. 25, 2022

(65) Prior Publication Data
US 2023/0206519 A1    Jun. 29, 2023

(30) Foreign Application Priority Data
Dec. 29, 2021    (KR) .................. 10-2021-0191848

(51) Int. Cl.
*G06T 11/20* (2006.01)
*G06T 11/40* (2006.01)
*G06T 17/00* (2006.01)

(52) U.S. Cl.
CPC ............ *G06T 11/203* (2013.01); *G06T 11/40* (2013.01); *G06T 17/00* (2013.01)

(58) Field of Classification Search
CPC ........ G06T 11/203; G06T 11/40; G06T 17/00
See application file for complete search history.

(56) References Cited

U.S. PATENT DOCUMENTS

| | | | | |
|---|---|---|---|---|
| 6,327,043 B1 * | 12/2001 | Rumph | ............... | G06K 15/1848 358/1.9 |
| 10,168,899 B1 * | 1/2019 | Feiszli | ................ | G06F 3/04883 |
| 10,825,242 B2 * | 11/2020 | Hong | ................... | G06V 20/647 |
| 2012/0287121 A1 * | 11/2012 | Hong | ..................... | G06F 30/00 345/419 |
| 2013/0127836 A1 * | 5/2013 | Joshi | ....................... | G06T 17/20 345/419 |
| 2015/0339850 A1 * | 11/2015 | Utsugi | .................... | G06T 17/10 345/420 |
| 2018/0204376 A1 * | 7/2018 | Winnemöller | .......... | G06T 19/20 |
| 2019/0147627 A1 * | 5/2019 | Chen | ...................... | G06T 9/002 345/157 |

FOREIGN PATENT DOCUMENTS

KR    1020160136525 A    11/2016

OTHER PUBLICATIONS

Pierre Benard, et al., "Line drawings from 3D models: a utorial," Foundations and Trends in Computer Graphics and Vision, Now Publishers, 2019, 11 (1-2), pp. 159. (Year: 2019).*

(Continued)

*Primary Examiner* — Michael Le
(74) *Attorney, Agent, or Firm* — Dinsmore & Shohl LLP; Yongsok Choi, Esq.

(57) ABSTRACT

Provided is a method for generating a freehand sketch of a 3D model for machine learning, which is executed by one or more processors, in which a method for generating freehand sketch data for machine learning includes receiving a 3D model of a target object, and generating a plurality of different freehand sketch images for the target object based on the 3D model.

6 Claims, 14 Drawing Sheets

(56) References Cited

OTHER PUBLICATIONS

Pierre Benard, et al., "Line drawings from 3D models: a tutorial,"Foundations and Trends in Computer Graphics and Vision, Now Publishers, 2019, 11 (1-2), pp. 159. (Year: 2019).*
Meijuan Ye, et al., "DeepShapeSketch : Generating hand drawing sketches from 3D objects," 2019 International Joint Conference on Neural Networks (IJCNN), 2019, pp. 1-8.
Pierre Bénard, et al., "Line drawings from 3D models: a tutorial," Foundations and Trends in Computer Graphics and Vision, Now Publishers, 2019, 11 (1-2), pp. 159.

* cited by examiner 1210  1220  1230

FREEHAND SKETCH IMAGE GENERATING METHOD AND SYSTEM FOR MACHINE LEARNING

CROSS-REFERENCE TO RELATED APPLICATION

This application claims priority under 35 U.S.C § 119 to Korean Patent Application No. 10-2021-0191848, filed in the Korean Intellectual Property Office on Dec. 29, 2021, the entire contents of which are hereby incorporated by reference.

TECHNICAL FIELD

The present disclosure relates to a method and a system for generating a freehand sketch image for machine learning, and more particularly, to a method and a system for generating a plurality of freehand sketch images from a 3D model.

BACKGROUND

For the related machine learning model, a freehand sketch composed of a single line is generated from a 3D model to simplify the complexity of machine learning. However, the single-line freehand sketch has a problem that it does not faithfully reflect the designer's actual sketch design.

To make up for this, a method for augmenting sketch data to an appropriate level for machine learning by using sample data has been proposed. However, this method still requires a sufficiently large amount of sample data, and there is a problem in that obtaining sketch data from users is time and cost consuming.

Accordingly, a method for automatically acquiring sketch data rather than obtaining this from the user has been proposed. This helps to reduce the consumption of time and money, but it does not retain the inherent characteristics of the freehand sketches of the user, and therefore, there is a problem that it is not helpful to generalize the freehand sketch to a database.

SUMMARY

In order to solve the problems described above, the present disclosure provides a method, a computer program stored in a recording medium, and an apparatus (system) for generating freehand sketch data for machine learning.

According to an embodiment of the present disclosure, provided is a method for automatically generating 2D freehand sketch data from previously generated 3D model to thus generate training data to generate a machine learning model for transforming a 2D sketch into a 3D model.

The present disclosure may be implemented in a variety of ways, including a method, a device (system) or a computer program stored in a readable storage medium.

According to an embodiment, a method for generating freehand sketch data for machine learning is provided, in which the method is executed by one or more processors and include receiving a 3D model of a target object, generating a plurality of different freehand sketch images for the target object based on the 3D model, in which each freehand sketch image includes a plurality of strokes and a plurality of guide lines.

According to an embodiment, the generating the plurality of freehand sketch images may include generating a first edge map of the target object viewed from a first point in a first direction based on the 3D model, generating a second edge map of the target object viewed from a second point in a second direction based on the 3D model, generating a first sketch image based on the first edge map, and generating a second sketch image based on the second edge map.

According to an embodiment, the generating the first edge map may include adjusting vertices in the 3D model, determining a projection matrix based on the first point and the first direction, adjusting the projection matrix, and generating the first edge map based on the 3D model and the adjusted projection matrix.

According to an embodiment, the generating the first sketch image may further include connecting pixels in the first edge map to generate a stroke, and starting a generation of a new stroke when a length of the stroke reaches a first predetermined threshold value or when the stroke is bent at an angle exceeding a predetermined second threshold value.

According to an embodiment, the generating the first sketch image may further include applying a thickness profile and a transparency profile for each generated stroke.

According to an embodiment, the generating the first sketch image may further include applying a texture for each generated stroke.

According to an embodiment, the generating the first sketch image may further include transforming each generated stroke into two straight lines by performing polygonization, and selecting some of the transformed straight lines and extending lengths of the selected straight lines to generate a first type of guide lines.

According to an embodiment, the generating the first sketch image may further include transforming each generated stroke into two straight lines including a straight line in a vertical direction and a straight line in a horizontal direction by performing polygonization, and selecting some of the transformed straight lines in the vertical direction and the straight lines in the horizontal direction and extending lengths of the selected straight lines to generate a second type of guide lines.

A computer program is provided, which is stored on a computer-readable recording medium for executing, on a computer, a method for generating a freehand sketch for machine learning according to another embodiment of the present disclosure.

An information processing system according to an embodiment may include a communication module, a memory, and one or more processors connected to the memory and configured to execute one or more computer-readable programs included in the memory, in which the one or more programs may include instructions for receiving a 3D model of a target object, and generating a plurality of different freehand sketch images for the target object based on the 3D model, and each freehand sketch image may include a plurality of strokes and a plurality of guide lines.

According to some embodiments of the present disclosure, by automatically generating a plurality of freehand sketches from a 3D model, it is possible to acquire data for machine learning more efficiently and effectively.

According to some embodiments of the present disclosure, by generating sketch images of various shapes using strokes, it is possible to generate sketch data using general forms of sketch styles, thereby enabling more universal machine learning.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
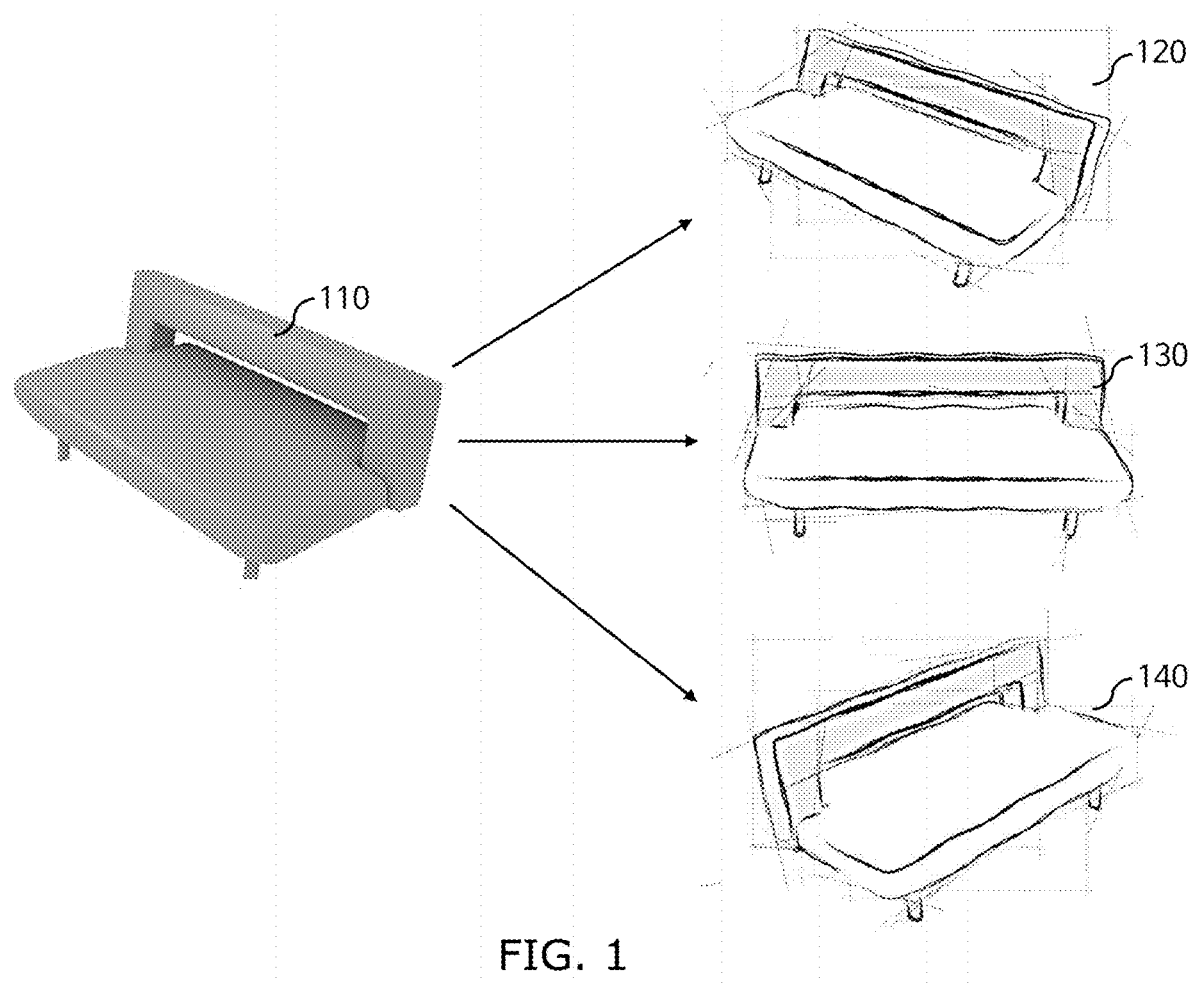
FIG. 1 is a diagram illustrating an example of generating a plurality of freehand sketch images from a 3D model according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various forms different from each other, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiments. Therefore the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally include (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment of the present disclosure, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, the "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, the "machine learning model" may include any model that is used for inferring an answer to a given input. According to an embodiment, the machine learning model may be a machine learning model that learns 2D sketch data to generate a 3D model. In some embodiments of the present disclosure, a model described as one machine learning model may include a plurality of machine learning models, and a plurality of models described as separate machine learning models may be implemented as a single machine learning model.

In the present disclosure, a "display" may refer to any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A.

In some embodiments of the present disclosure, "a plurality of images" may refer to an image including a plurality of images, and an "image" may refer to a plurality of images included in the image.

FIG. 1 is a diagram illustrating an example of generating a plurality of freehand sketches from a 3D model according to an embodiment. An information processing system according to an embodiment may generate a machine learning model capable of transforming a 2D sketch into a 3D model by training with a plurality of training data pairs including a 3D model and a corresponding 2D freehand sketches. To this end, the information processing system may generate a plurality of freehand sketch images based on the 3D model of a target object. The freehand sketch may refer to a form of image like a sketch of a target object for design that a user (e.g., a designer, and the like) himself or herself has drawn.

In an embodiment, the information processing system may receive a 3D model 110 to generate a freehand sketch image. In this case, the information processing system may generate a plurality of different freehand sketch images 120, 130, and 140 for one 3D model 110.

The plurality of freehand sketch images 120, 130, and 140 may be 2D images of the 3D model 110 viewed from angles different from each other. For example, for the plurality of freehand sketch images, freehand sketches viewed from the front, left side, and right side may be generated. While FIG. 1 illustrates that three freehand sketch images 120, 130, and 140 are generated from one 3D model 110, embodiments are not limited thereto, and any number of freehand sketch images may be generated.

A pair of the 3D model 110 and the first freehand sketch image 120, a pair of the 3D model 110 and the second freehand sketch image 130, and a pair of the 3D model 110 and the first freehand sketch image 120 may be used as training data for training the machine learning model, respectively. In a similar manner, pairs of various previously generated 3D models and freehand sketch images corresponding thereto may be generated and used as the training data.

The plurality of freehand sketch images 120, 130, and 140 may include a plurality of strokes and a plurality of guide lines, respectively. The plurality of strokes may be line segments forming the target object in the sketch image. The plurality of guide lines may include a first type of supporting guide line indicating the main direction of the sketch, a second type of construction line indicating the geometric structure of the sketch in a simplified manner, and the like.

In an embodiment, the information processing system may generate an edge map using a projection matrix for stroke generation. In addition, the information processing system may generate a stroke using pixels in the edge map. For details, reference is made to the description of FIGS. 4 to 8 which will be described below.

In addition, in order to generate a guide line, the information processing system may generate a stroke from the 3D model, adjust thickness and transparency of the stroke, or adjust a texture. For details, reference will be made to the description of FIGS. 9 to 12 which will be described below.

In the above description, the process of generating a plurality of freehand sketch images from the 3D model has been described as being performed by the information processing system, but the embodiment is not limited thereto and may be implemented differently in other embodiments. For example, at least some or all of a series of processes for generating a plurality of freehand sketch images from the 3D model may be performed by a user terminal. However, for convenience of description, it will be assumed below that the process of generating a freehand sketch image is performed by the information processing system.

According to the method for generating a freehand sketch image from a 3D model for machine learning of the present disclosure, it is possible to perform machine learning of 3D model more efficiently and effectively, by generating various types of freehand sketch images including a plurality of strokes and a plurality of guide lines.

Figure 2:
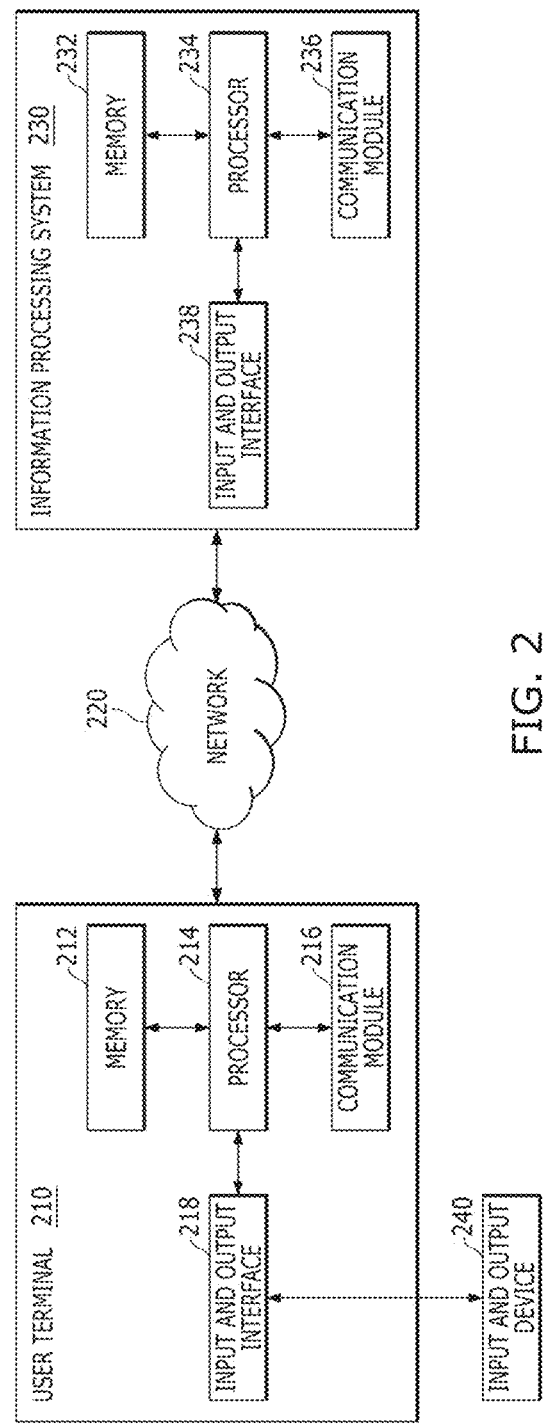
FIG. 2 is a block diagram illustrating an internal configuration of a user terminal and an information processing system according to an embodiment.

FIG. 2 is a block diagram illustrating an internal configuration of a user terminal 210 and an information processing system 230 according to an embodiment. The user terminal 210 may refer to any computing device including, for example, a mobile phone terminal, a tablet terminal, a PC terminal, and the like, which is capable of executing a 3D modeling application, a freehand sketch image generation application for 3D model learning, a web browser, and the like and also capable of wired/wireless communication. As illustrated, the user terminal 210 may include a memory 212, a processor 214, a communication module 216, and an input and output interface 218. Likewise, the information processing system 230 may include a memory 232, a processor 234, a communication module 236, and an input and output interface 238. As illustrated in FIG. 2, the user terminal 210 and the information processing system 230 may be configured to communicate information and/or data through a network 220 using the respective communication modules 216 and 236. In addition, an input and output device 240 may be configured to input information and/or data to the user terminal 210 or to output information and/or data generated from the user terminal 210 through the input and output interface 218.

The memories 212 and 232 may include any non-transitory computer-readable recording medium. According to an embodiment, the memories 212 and 232 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for a 3D modeling application installed and driven in the user terminal 210, a freehand sketch image generation application for machine learning of a 3D model, and the like) may be stored in the memories 212 and 232.

These software components may be loaded from a computer-readable recording medium separate from the memories 212 and 232. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 212 and 232 through the communication modules rather than the computer-readable recording medium. For example, at least one program may be loaded into the memories 212 and 232 based on a computer program installed by files provided by developers or a file distribution system that distributes an installation file of an application through the network 220.

The processors 214 and 234 may be configured to process the instructions of the computer program by performing basic arithmetic, logic, and input and output operations. The instructions may be provided to the processors 214 and 234 from the memories 212 and 232 or the communication modules 216 and 236. For example, the processors 214 and 234 may be configured to execute the received instructions according to program code stored in a recording device such as the memories 212 and 232.

The communication modules 216 and 236 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to generate freehand sketch data, 3D model data, and the like) generated by the processor 214 of the user terminal 210 according to the program code stored in the recording device such as the memory 212 or the like may be transmitted to the information processing system 230 through the network 220 under the control of the communication module 216. Conversely, a control signal or a command provided under the control of the processor 234 of the information processing system 230 may be received by the user terminal 210 through the communication module 216 of the user terminal 210 via the communication module 236 and the network 220. For example, the user terminal 210 may receive the freehand sketch image and the like from the information processing system 230 through the communication module 216.

The input and output interface 218 may be a means for interfacing with the input and output device 240. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 218 may be a means for interfacing with a device such as a touch screen or the like that integrates a configuration or function for performing inputting and outputting. For example, when the processor 214 of the user terminal 210 processes the instructions of the computer program loaded in the memory 212, a service screen or the like, which is configured with the information and/or data provided by the information processing system 230 or other user terminals, may be displayed on the display through the input and output interface 218. While FIG. 2 illustrates that the input and output device 240 is not included in the user terminal 210, embodiments are not limited thereto, and the input and output device 240 may be configured as one device with the user terminal 210. In addition, the input and output interface 238 of the information processing system 230 may be a means for interfacing with a device (not illustrated) for inputting or outputting that may be connected to, or included in the information processing system 230. In FIG. 2, while the input and output interfaces 218 and 238 are illustrated as the components configured separately from the processors 214 and 234, embodiments are not limited thereto, and the input and output interfaces 218 and 238 may be configured to be included in the processors 214 and 234.

The user terminal 210 and the information processing system 230 may include more than those components illustrated in FIG. 2. Meanwhile, most of the related components may not necessarily require exact illustration. According to an embodiment, the user terminal 210 may be implemented to include at least a part of the input and output device 240 described above. In addition, the user terminal 210 may further include other components such as a transceiver, a Global Positioning System (GPS) module, a camera, various sensors, a database, and the like. For example, when the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210. According to an embodiment, the processor 214 of the user terminal 210 may be configured to operate an application or the like that provides freehand sketch images. In this case, a code associated with the application and/or program may be loaded into the memory 212 of the user terminal 210.

While the program for the application or the like that provides freehand sketch images is being operated, the processor 214 may receive text, image, video, audio, and/or action, and so on inputted or selected through the input device such as a touch screen connected to the input and output interface 218, a keyboard, a camera including an audio sensor and/or an image sensor, a microphone, and so on, and store the received text, image, video, audio, and/or action, and so on in the memory 212, or provide the same to the information processing system 230 through the communication module 216 and the network 220. For example, the processor 214 may receive a 3D model through the input and output interface 218, and provide a request to generate a 3D model and a freehand sketch image to the information processing system 230 through the communication module 216 and the network 220 in order to generate a freehand sketch image for the 3D model.

The processor 214 of the user terminal 210 may be configured to manage, process, and/or store the information and/or data received from the input device 240, another user terminal, the information processing system 230 and/or a plurality of external systems. The information and/or data processed by the processor 214 may be provided to the information processing system 230 through the communication module 216 and the network 220. The processor 214 of the user terminal 210 may transmit the information and/or data to the input and output device 240 through the input and output interface 218 to output the same. For example, the processor 214 may display the received information and/or data on a screen of the user terminal.

The processor 234 of the information processing system 230 may be configured to manage, process, and/or store information and/or data received from a plurality of user terminals 210 and/or a plurality of external systems. The information and/or data processed by the processor 234 may be provided to the user terminals 210 through the communication module 236 and the network 220. For example, the processor 234 of the information processing system 230 may receive the 3D model of the target object from the user terminal 210 and generate a freehand sketch image including a plurality of strokes and a plurality of guide lines for the 3D model. The processor 234 of the information processing system 230 may provide the generated plurality of freehand sketch images to the user terminal 210 through the communication module 236 and the network 220.

The processor 234 of the information processing system 230 may be configured to output the processed information and/or data through the output device 240 such as a device (e.g., a touch screen, a display, and so on) capable of outputting a display of the user terminal 210 or a device (e.g., a speaker) capable of outputting an audio. For example, the processor 234 of the information processing system 230 may be configured to provide a 3D model of the target object to the user terminal 210 through the communication module 236 and the network 220 and output the 3D model through a device capable of outputting a display, or the like of the user terminal 210.

Hereinafter, a method for generating a plurality of different freehand sketch images from a 3D model according to the present disclosure will be described.

Figure 3:
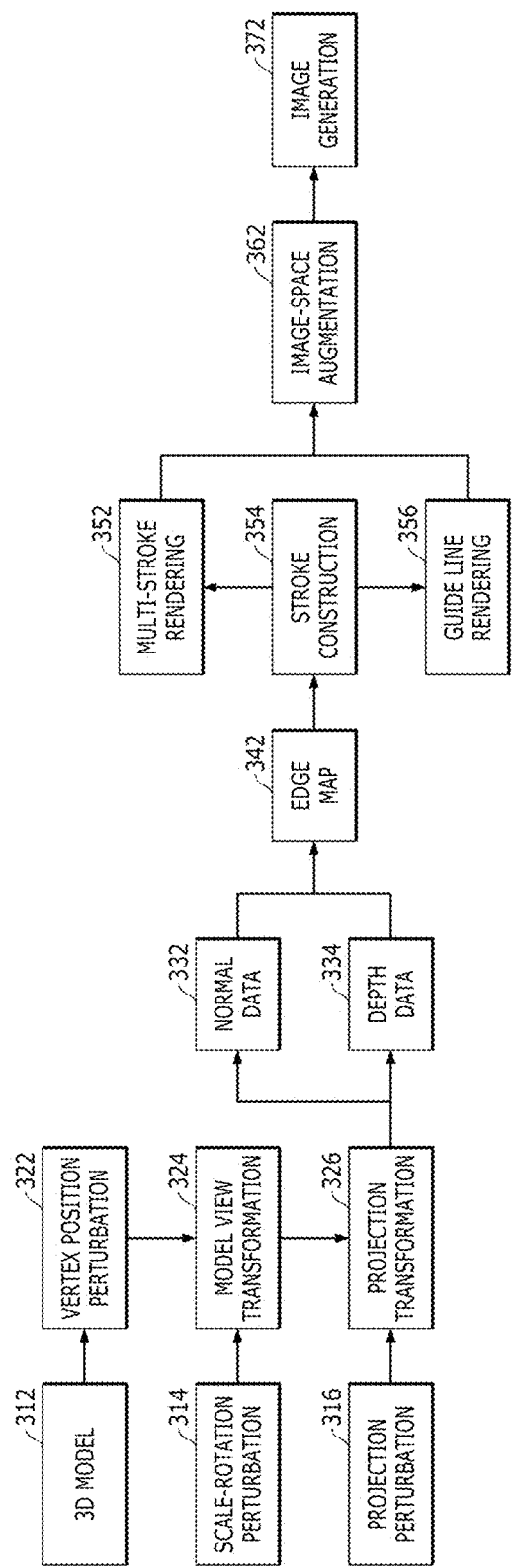
FIG. 3 is a diagram illustrating a method for generating a sketch image from a 3D model according to an embodiment.

FIG. 3 is a diagram illustrating a method for generating a freehand sketch image from a 3D model according to an embodiment. Referring to FIG. 3, first, the information processing system may receive (312) a 3D model. The 3D model may be data representing the 3D shape of the target object.

When the 3D model is received, the information processing system may adjust or perturb (322) positions of vertices in the 3D model. After fine-tuning the positions of the vertices in the 3D model, the information processing system may perform model view transformation 324. The model view transformation may include a modeling transformation and a viewing transformation. Specifically, the information processing system may perform modeling transformation that transforms the 3D model from a local coordinate system to a global coordinate system through scale-rotation perturbation/adjustment 314. For example, the information processing system may perform modeling transformation by combining at least one of a position value, a rotation value, and a size value.

In addition, the information processing system may perform the model view transformation 324 after the modeling transformation. In an embodiment, the model view transformation 324 may represent transformation of the world coordinate system of the 3D model into a view coordinate system viewed from a specific point and a specific direction. That is, the information processing system may perform a plurality of view transformations corresponding to a plurality of view coordinate systems viewed from different points and different directions.

After the model view transformation 324 is performed, the information processing system may perform projection transformation 326 based on projection perturbation/adjustment 316. The projection transformation 326 may represent transforming the view coordinate system into the clip coordinate system. The projection transformation may be divided into a linear projection transformation with reduction due to perspective, and a projection transformation without perspective reduction.

Specifically, the information processing system may determine a projection matrix according to a specific point and a specific direction for the projection transformation 326. Then, the information processing system may perform the projection transformation 326 by adjusting the projection matrix according to whether or not it is reduced due to perspective. The information processing system may determine the projection matrix while changing specific points and specific directions. For example, the information processing system may determine a projection matrix based on a first point and a first direction, or determine a projection matrix based on a second point different from the first point and a second direction different from the first direction. That is, the information processing system may determine any one of a plurality of projection matrices according to the point and the direction.

The information processing system may generate an edge map 342 from normal data 332 and depth data 334. The normal data 332 and the depth data 334 may be generated by the projection transformation. Accordingly, the information processing system may generate different normal data 332 and different depth data 334 according to the points and directions at which the projection matrix is determined. Accordingly, the information processing system may generate different edge maps based on the different normal data 332 and the different depth data 334.

When at least one or more edge maps are generated, the information processing system may connect pixels in the at least one or more edge maps to form a stroke 354. Accordingly, the information processing system may generate strokes forming a freehand sketch image for each of the different edge maps. Accordingly, the present disclosure may generate a plurality of freehand sketch images for each of the different edge maps.

To describe the configuration of the stroke in more detail, the information processing system may perform multi-stroke rendering 352 based on the length and angle of the stroke configured through the edge map. That is, the information processing system may generate at least one stroke based on the length and angle of the stroke. For example, when the length of the stroke reaches a first predetermined threshold value, the information processing system may end the generation of the stroke and generate a new stroke. As another example, when the bending angle of the stroke exceeds a predetermined second threshold value, the information processing system may end the generation of the stroke and generate a new stroke.

In addition, the information processing system may perform guide line rendering 356 on the stroke generated through the edge map. The guide line may be a first type of supporting guide line indicating the main direction of the sketch, a second type of construction line indicating the geometric structure of the sketch in a simplified manner, and the like. The first type of guide line may be called a supporting guide line. The second type of guide line may be called a construction guide line.

Specifically, the information processing system may polygonize the stroke to transform the stroke into a plurality of straight lines. Then, a guide line may be generated by using some of the plurality of straight lines. For details of the generation of the guide line, reference is made to the description which will be provided below with reference to FIGS. 9 to 12.

The information processing system may perform image-space augmentation 362 after rendering the strokes and guide lines. The image-space augmentation 362 may be applied at the pixel level. After the image-space augmentation is completed, the information processing system may generate (372) a plurality of freehand sketch images.

The method for generating a plurality of freehand sketch images from a 3D model has been described above. According to the present disclosure described above, for machine learning, the user is able to learn various types of freehand sketch images more conveniently even without drawing various freehand sketches for the 3D model.

Hereinafter, a method for generating a stroke of a sketch image from a 3D model will be described.

Figure 4:
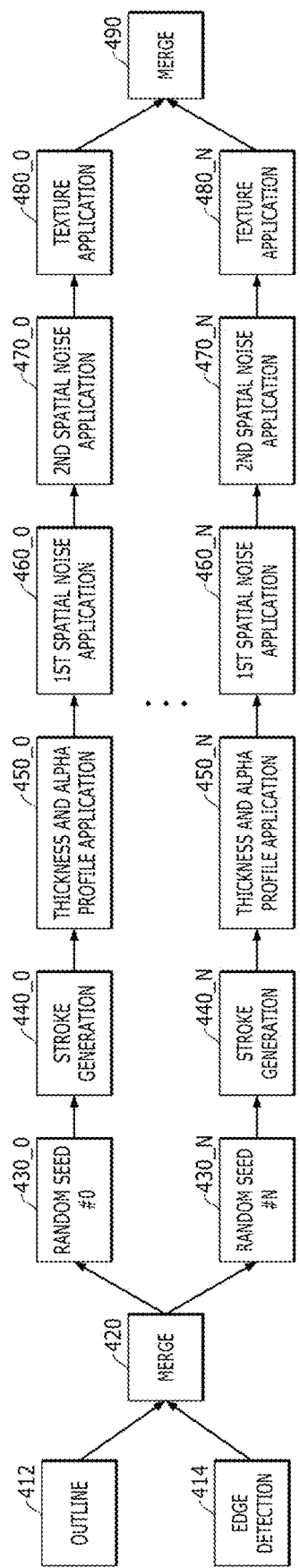
FIG. 4 is a diagram illustrating a method for generating a stroke of a sketch image from a 3D model according to an embodiment.

FIG. 4 is a diagram illustrating a method for generating a stroke of a sketch image from a 3D model according to an embodiment. As illustrated, the information processing system may first perform outline 412 and edge detection 414. For example, the information processing system may detect a silhouette and depth edge based on the outline 412 and the edge 414 of the edge map. Then, the information processing system may merge 420 the outlines 412 and the edges 414.

In order to generate a human-like freehand sketch image, the information processing system may generate sketch images different from each other in terms of at least one of thickness of the stroke, transparency, noise application, and texture application. To this end, the information processing system may repeat the process of generating different strokes a preset number of times (e.g., N times). For example, as illustrated in FIG. 4, the process from random seed #0 (430_0) to random seed #N (430_N) may be repeatedly performed, while changing at least one of the thickness of the stroke, the transparency, the noise application, and the texture application. Hereinafter, since the same process is repeated, the process will be described based on random seed #0 (430_0) as a representative example, and the details of the process from random seed #1 to random seed #N will be referenced to the description of random seed #0.

When the random seed #0 starts, the information processing system may generate a stroke 440_0. Strokes may be generated by chaining outline or edge pixels at any point. At this time, the information processing system may end generating a new stroke based on the length of the generated stroke and the rotation angle of the stroke. For example, when the length of the generated stroke reaches a first threshold value or the generated stroke is bent at an angle exceeding the second threshold value, the information processing system may end generating a new stroke.

After the stroke is generated, the information processing system may apply a thickness and alpha profile 450_0 to the generated stroke. Specifically, the information processing system may apply at least one of a thickness profile and a transparency profile of the stroke as a specific value. This will be described below with reference to FIG. 6.

Then, the information processing system may sequentially perform a first spatial noise application 460_0 and a second spatial noise application 470_0. The primary spatial noise and the secondary spatial noise may be perlin noise functions having different scale levels. This will be described below with reference to FIG. 7. Finally, the information processing system may apply a texture 480_0 to the generated stroke. For example, a texture with lines drawn using a pencil, pen, or the like on paper may be applied to the generated strokes 490.

The information processing system may repeatedly perform the process of generating strokes from random seed #0 to random seed #N, and merge each stroke to generate a plurality of strokes.

Figure 5:
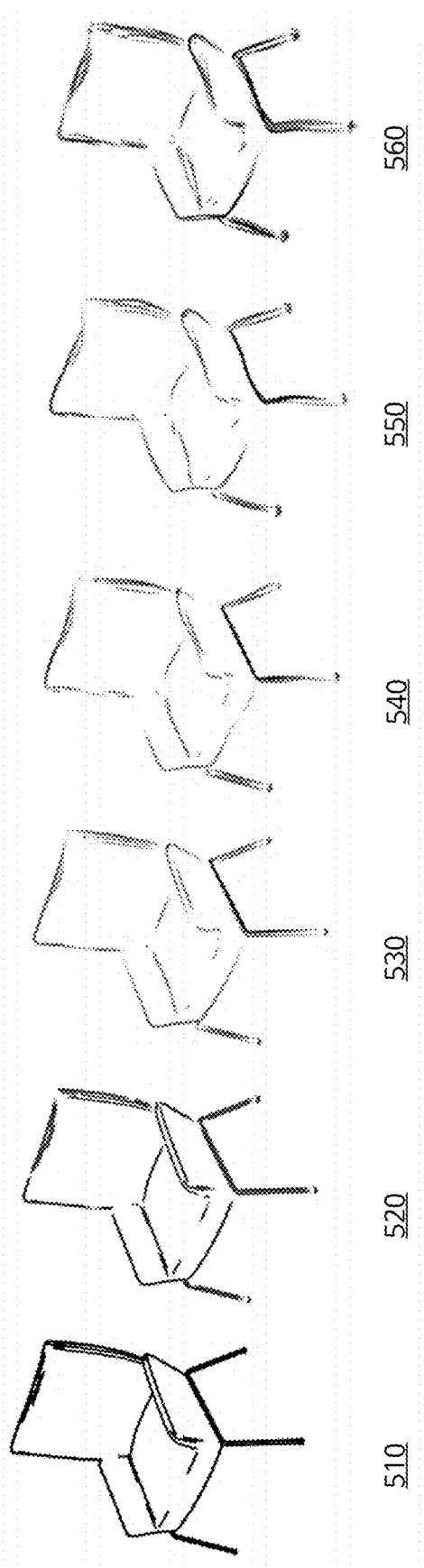
FIG. 5 is a diagram illustrating an example of generating a plurality of strokes of a sketch image from a 3D model according to an embodiment.

FIG. 5 is a diagram illustrating an example of generating a plurality of strokes of a sketch image from a 3D model according to an embodiment. A first FIG. 510 illustrates a result of merging the outlines and the edges of the edge map. A second FIG. 520 illustrates an example of generating a stroke using one of a plurality of random seeds. A third FIG. 530 illustrates an example of applying the thickness and alpha profile to a plurality of strokes. A fourth FIG. 540 and a fifth FIG. 550 illustrate examples of applying the primary spatial noise and the secondary spatial noise on a plurality of strokes, respectively. A sixth FIG. 560 illustrates an example of merging a plurality of sketches generated from a plurality of random seeds to generate a sketch formed of the plurality of strokes.

Figure 6:
FIG. 6 is a diagram illustrating an example of a thickness profile and an alpha profile according to an embodiment.

FIG. 6 is a diagram illustrating an example of a thickness profile 610 and an alpha profile 620 according to an embodiment. As illustrated, the information processing system may use a profile that varies in thickness and transparency along the stroke. The thickness of the stroke may increase until the midpoint and then decrease after the midpoint. Conversely, the transparency of the stroke may decrease until the midpoint and then increase after the midpoint. As illustrated, since the thickness and transparency vary according to position in one stroke, it is possible to create a human-like stroke.

Figure 7:
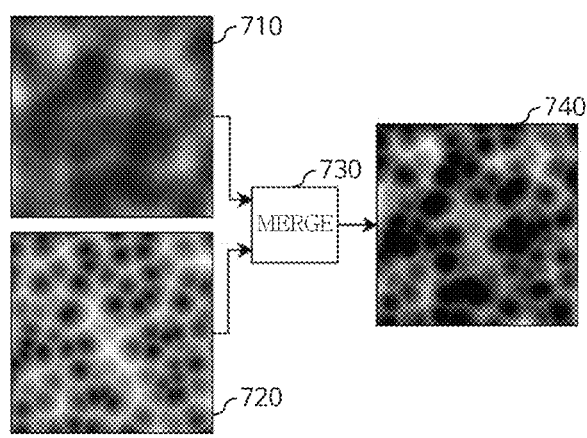
FIG. 7 illustrates an example of primary spatial noise and secondary spatial noise according to an embodiment.

FIG. 7 illustrates an example of a primary spatial noise 710 and a secondary spatial noise 720 according to an embodiment. As illustrated, the primary spatial noise 710 may generate a stroke variation to simulate a sketching skill level of a designer. The secondary spatial noise 720 may incorporate small perturbations along the stroke to simulate the steadiness of the designer's hand. The information processing system may merge (730) the first and second spatial noises 710 and 720 to generate an integrated spatial noise 740. Accordingly, the information processing system may apply the integrated spatial noise 740 to the stroke.

Figure 8:
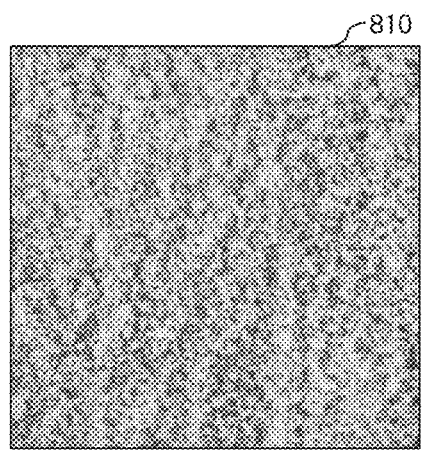
FIG. 8 illustrates an example of a texture applied to a stroke according to an embodiment.

FIG. 8 illustrates an example of a texture 810 applied to a stroke according to an embodiment. As illustrated, the texture 810 may be for realizing paper, a texture of a pencil, a pen, or the like drawn on the paper, or a texture of the pen.

Hereinafter, a method for generating a guide line included in a freehand sketch image will be described.

Figure 9:
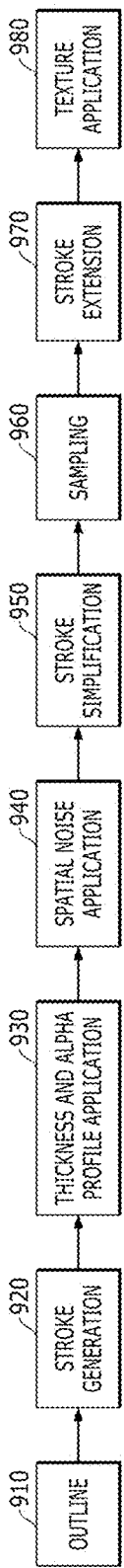
FIG. 9 is a diagram illustrating a method for generating a first type of guide line according to an embodiment.

FIG. 9 is a diagram illustrating a method for generating a first type of guide line according to an embodiment. The real designers may sketch guide lines that indicate the main direction of the sketch when sketching. Accordingly, in the present disclosure, a freehand sketch similar to a designer's sketch is implemented by generating a first type of guide line indicating the main direction of the sketch.

As illustrated, the information processing system may extract an outline 910 from the 3D model. Then, the information processing system may generate (920) a stroke based on the outline 910. Then, the information processing system may apply a thickness and alpha profile 930 to the stroke, and apply a spatial noise 940. For convenience of detailed description, description of steps 910 to 940 is replaced with the description of 412 to 470_0 of FIG. 4 provided above.

After applying the spatial noise, the information processing system may perform a stroke simplification 950. For example, the information processing system may polygonize the strokes to transform a plurality of strokes into a plurality of straight lines. The information processing system may perform sampling 960 of selecting some of the plurality of straight lines transformed by the polygonization.

Then, the information processing system may extend the selected straight lines 970. In this case, the information processing system may extend the straight lines on both sides to overflow the outline of the target object. That is, it may extend the straight line in the main direction of the sketch for the outline sketch.

The information processing system may generate the first type of guide line by applying the texture 980 to the finally generated straight line. The method for generating the first type of guide line has been described above. According to the present disclosure described above, it is possible to implement the guide lines included in the real-world designer sketch, and implement a more a freehand sketch image more similar to the real one.

Figure 10:
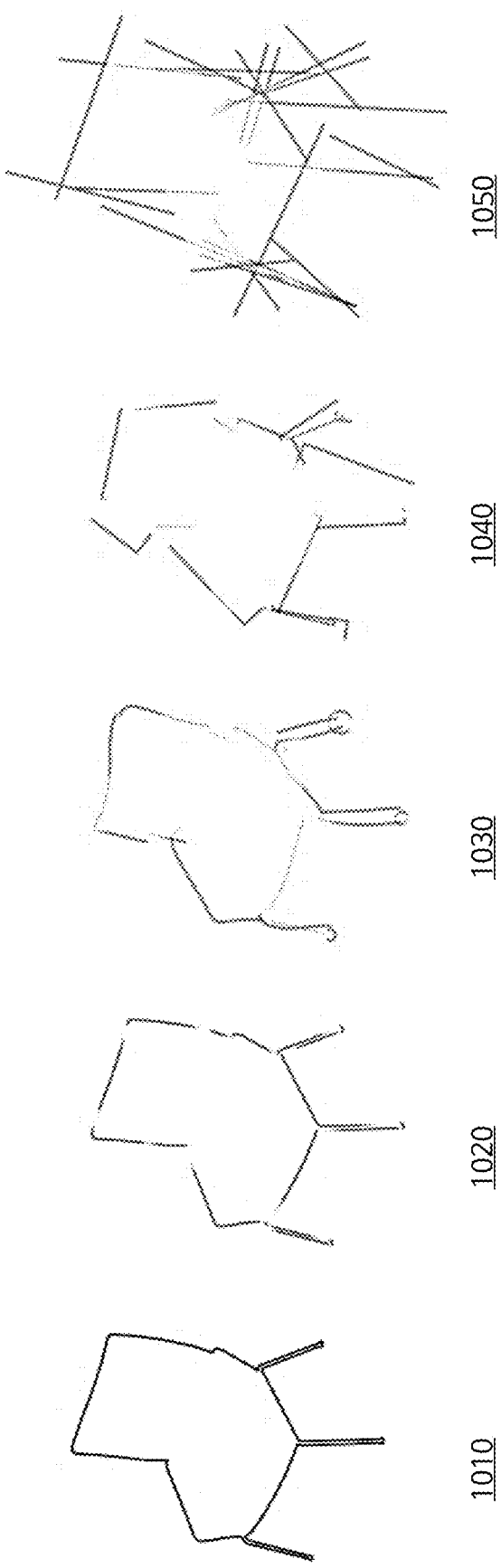
FIG. 10 is a diagram illustrating an example of generating a first type of guide line of a sketch image according to an embodiment.

FIG. 10 is a diagram illustrating an example of generating a first type of guide line of a sketch image according to an embodiment. A first FIG. 1010 illustrates an example of an outline extracted from a 3D model. A second FIG. 1020 illustrates an example of a stroke generated based on the outline. A third FIG. 1030 illustrates an example of applying a spatial noise on the stroke. A fourth FIG. 1040 illustrates an example of polygonizing the stroke to transform a plurality of strokes into a plurality of straight lines. A fifth FIG. 1050 illustrates an example of performing sampling of selecting some of the generated straight lines, and extending the selected straight lines to generate a first type of guide line.

Hereinafter, a method for generating a second type of guide line will be described.

Figure 11:
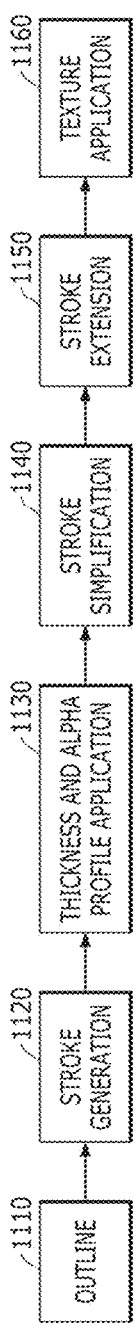
FIG. 11 is a diagram illustrating a method for generating a second type of guide line of a sketch image according to an embodiment.

FIG. 11 is a diagram illustrating a method for generating a second type of guide line of a sketch image according to an embodiment. Designers may sketch guide lines that indicate the structure of a target object when sketching. The second type of guide line may be a guide line indicating a structural characteristic of the target object.

As illustrated, the information processing system may extract an outline (1110), generate a stroke (1120), and apply a thickness and alpha profile (1130) to generate a second type of guide line. For convenience of description, description of steps 1110 to 1130 is replaced with the description of 412 to 450_0 of FIG. 4 provided above.

After applying the thickness and alpha profile, the information processing system may proceed to stroke simplification (1140). For example, the information processing system may polygonize to transform the stroke into two straight lines in vertical direction and in horizontal direction. That is, the two transformed straight lines may form a 90 degree angle.

The information processing system may select some of the transformed vertical straight lines and horizontal straight lines, and extend the lengths of the selected straight lines (1150). Then, the information processing system may apply a texture (1160) to generate the second type of guide line.

Figure 12:
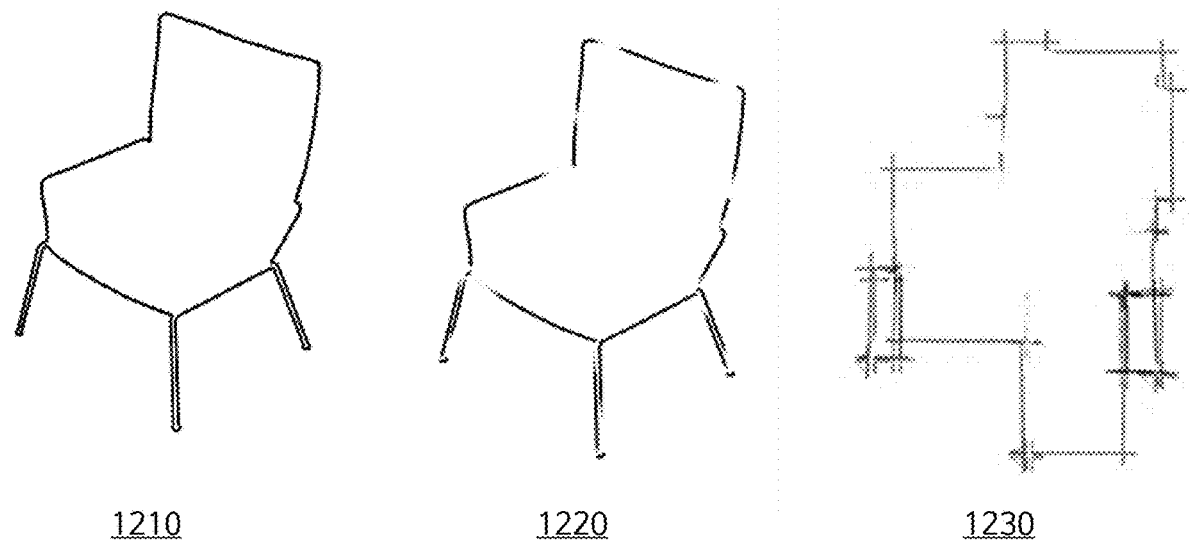
FIG. 12 is a diagram illustrating an example of generating a second type of guide line of a sketch image according to an embodiment.

FIG. 12 is a diagram illustrating an example of generating a second type of guide line of a sketch image according to an embodiment. A first FIG. 1210 illustrates an example of an outline extracted from a 3D model. A second FIG. 1220 illustrates an example of a stroke generated based on the outline. A third FIG. 1230 illustrates an example of polygonizing the stroke to transform a plurality of strokes into straight lines in a vertical direction and straight lines in a horizontal direction, and extending the lengths of the straight lines.

Hereinafter, a method for generating a freehand sketch formed of a plurality of strokes and a plurality of guide lines will be described.

Figure 13:
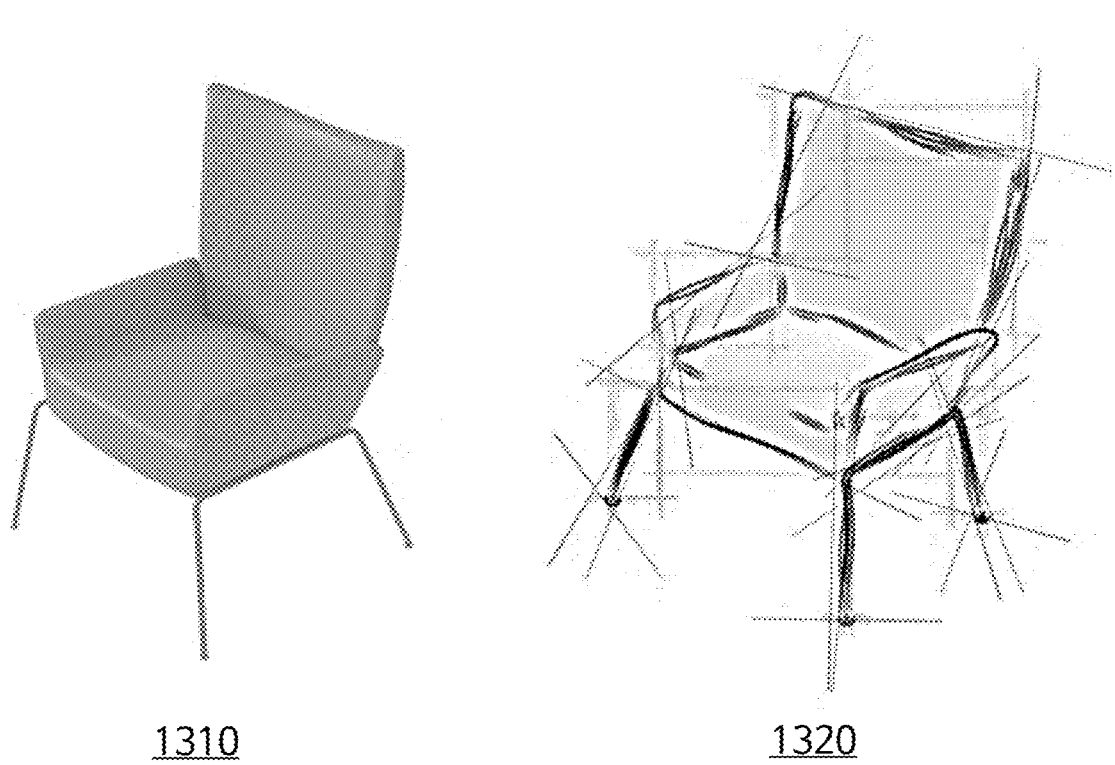
FIG. 13 is a diagram illustrating an example of a 2D sketch image generated from a 3D model according to an embodiment.

FIG. 13 is a diagram illustrating an example of a 2D sketch image 1320 generated from a 3D model 1310 according to an embodiment. As illustrated, the 2D sketch image 1320 includes a plurality of strokes and a plurality of guide lines. According to this configuration, it is possible to automatically generate a freehand sketch image having a shape similar to the real designer sketch.

Figure 14:
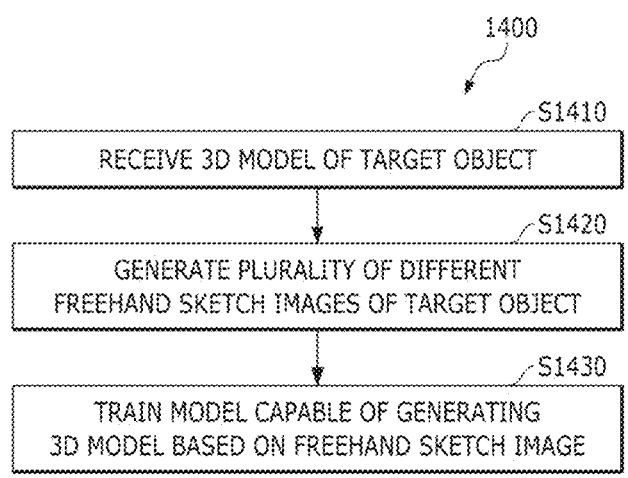
FIG. 14 is a diagram illustrating an example of a method for generating a sketch image from a 3D model according to an embodiment.

FIG. 14 is a diagram illustrating an example of a method 1400 for generating a sketch image from a 3D model according to an embodiment. The method 1400 may be performed by one or more processors of the information processing system or user terminal. As illustrated, the information processing system may receive a 3D model of the target object to generate a plurality of freehand sketch images, at S1410.

When the 3D model is received, the information processing system may generate a plurality of different freehand sketch images of the target object, at S1420. More specifically, the information processing system may generate a first sketch image of the target object viewed from a first point in a first direction, and a second sketch image of the target object viewed from a second point different from the first point in a second direction different from the first direction. That is, it is possible to generate sketch images of the same 3D model viewed from various angles.

To this end, the information processing system may generate different edge maps to generate sketch images different from each other. For example, the information processing system may generate a first edge map of the target object viewed from the first point in the first direction, and a second edge map of the target object viewed from the second point in the second direction.

The information processing system may adjust the vertices in the 3D model to generate an edge map. In addition, it may determine the projection matrix based on a point and a direction expressed by the edge map. In this case, the information processing system may adjust the projection matrix in consideration of errors due to perspective. Then, the information processing system may generate an edge map based on the adjusted projection matrix and the 3D model. In this case, the edge map may include normal data and depth data.

The information processing system may generate a freehand sketch image using the edge map. More specifically, the information processing system may connect the pixels in the edge map to generate a stroke. In this case, the information processing system may generate a new stroke based on the length and rotation angle of the generated stroke. For example, the information processing system may generate a new stroke when the length of the generated stroke exceeds a first predetermined threshold value or the rotation angle of the stroke exceeds a second threshold value.

In addition, the information processing system may apply at least one of thickness, transparency, noise, and texture of the generated stroke. For details, reference is made to the description of FIGS. 4 to 8 provided above.

Meanwhile, the information processing system may generate a plurality of guide lines by using the generated stroke. For example, the information processing system may generate a first type of guide line indicating the main direction of the sketch or generate a second type of guide line indicating a structural characteristic of the target object. For details, reference is made to the description of FIGS. 9 to 12 provided above. Then, the information processing system may train a model capable of generating a 3D model based on the generated freehand sketch image and the 3D model, at S1430.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented as instructions stored on a computer-readable medium such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. In addition, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, embodiments are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for generating freehand sketch data for machine learning, the method being executed by one or more processors and comprising:
   receiving a 3D model of a target object; and
   generating a plurality of different freehand sketch images for the target object based on the 3D model,
   wherein each freehand sketch image includes a plurality of strokes and a plurality of guide lines,
   wherein the generating the plurality of freehand sketch images comprises:
   generating a first edge map of the target object viewed from a first point in a first direction based on the 3D model;
   generating a second edge map of the target object viewed from a second point in a second direction based on the 3D model;
   generating a first sketch image based on the first edge map; and
   generating a second sketch image based on the second edge map,
   wherein the generating the first edge map comprises:
   adjusting vertices in the 3D model;
   determining a projection matrix based on the first point and the first direction;
   adjusting the projection matrix; and
   generating the first edge map based on the 3D model and the adjusted projection matrix,
   wherein the generating the first sketch image further comprises connecting pixels in the first edge map to generate a stroke, and starting a generation of a new stroke when a length of the stroke reaches a first predetermined threshold value or when the stroke is bent at an angle exceeding a predetermined second threshold value, and
   wherein the generating the first sketch image further comprising:
   transforming each generated stroke into two straight lines by performing polygonization; and
   selecting some of the transformed straight lines and extending lengths of the selected straight lines to generate a first type of guide lines.

2. The method according to claim 1, wherein the generating the first sketch image further comprises applying a thickness profile and a transparency profile for each generated stroke.

3. The method according to claim 1, wherein the generating the first sketch image further comprises applying a texture for each generated stroke.

4. A non-transitory computer-readable recording medium storing instructions for execution by one or more processors that, when executed by the one or more processors, cause the one or more processors to perform the method according to claim 1.

5. A method for generating freehand sketch data for machine learning, the method being executed by one or more processors and comprising:
   receiving a 3D model of a target object; and
   generating a plurality of different freehand sketch images for the target object based on the 3D model,
   wherein each freehand sketch image includes a plurality of strokes and a plurality of guide lines,
   wherein the generating the plurality of freehand sketch images comprises:
   generating a first edge map of the target object viewed from a first point in a first direction based on the 3D model;
   generating a second edge map of the target object viewed from a second point in a second direction based on the 3D model;
   generating a first sketch image based on the first edge map; and
   generating a second sketch image based on the second edge map,
   wherein the generating the first edge map comprises:
   adjusting vertices in the 3D model;
   determining a projection matrix based on the first point and the first direction;
   adjusting the projection matrix; and
   generating the first edge map based on the 3D model and the adjusted projection matrix,
   wherein the generating the first sketch image further comprises connecting pixels in the first edge map to generate a stroke, and starting a generation of a new stroke when a length of the stroke reaches a first predetermined threshold value or when the stroke is bent at an angle exceeding a predetermined second threshold value, and
   wherein the generating the first sketch image further comprises:
   transforming each generated stroke into two straight lines including a straight line in a vertical direction and a straight line in a horizontal direction by performing polygonization; and
   selecting some of the transformed straight lines in the vertical direction and the straight lines in the horizontal direction and extending lengths of the selected straight lines to generate a second type of guide lines.

6. An information processing system comprising:
   a communication module;
   a memory; and
   one or more processors connected to the memory and configured to execute one or more computer-readable programs included in the memory, wherein the one or more computer-readable programs further include instructions for:
   receiving a 3D model of a target object; and
   generating a plurality of different freehand sketch images for the target object based on the 3D model, and
   wherein each freehand sketch image includes a plurality of strokes and a plurality of guide lines,
   wherein the generating the plurality of freehand sketch images comprises:
   generating a first edge map of the target object viewed from a first point in a first direction based on the 3D model;
   generating a second edge map of the target object viewed from a second point in a second direction based on the 3D model;
   generating a first sketch image based on the first edge map; and
   generating a second sketch image based on the second edge map,
   wherein the generating the first edge map comprises:

adjusting vertices in the 3D model;
determining a projection matrix based on the first point and the first direction;
adjusting the projection matrix; and
generating the first edge map based on the 3D model and the adjusted projection matrix,
wherein the generating the first sketch image further comprises connecting pixels in the first edge map to generate a stroke, and starting a generation of a new stroke when a length of the stroke reaches a first predetermined threshold value or when the stroke is bent at an angle exceeding a predetermined second threshold value, and
wherein the generating the first sketch image further comprising:
transforming each generated stroke into two straight lines by performing polygonization; and
selecting some of the transformed straight lines and extending lengths of the selected straight lines to generate a first type of guide lines.

* * * * *